Nov. 4, 1952 L. E. RAUSENBERGER ET AL 2,616,584
FILLER CAP ASSEMBLY
Filed March 20, 1950 2 SHEETS—SHEET 2
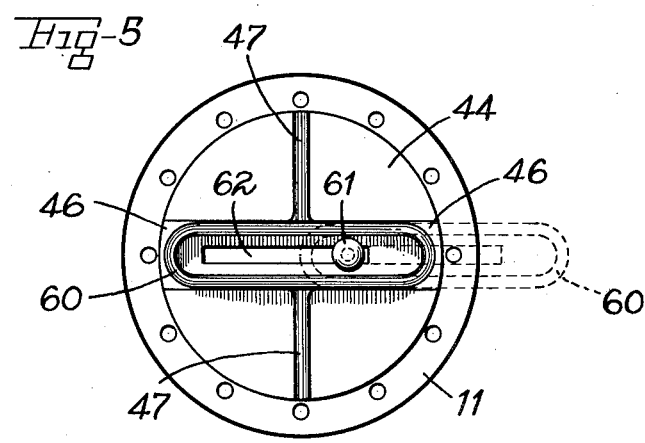
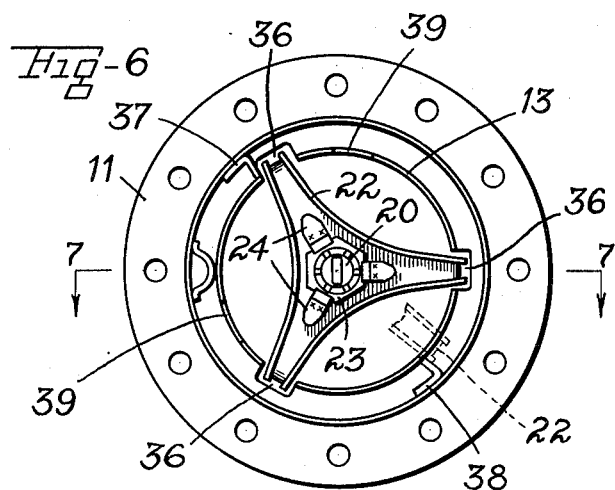
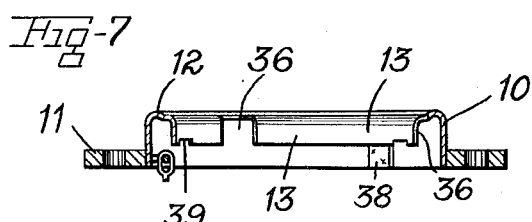
Inventors
LARENCE E. RAUSENBERGER &
DELMOND L. GETZ
By Marschal & Biebel
ATTORNEYS Patented Nov. 4, 1952

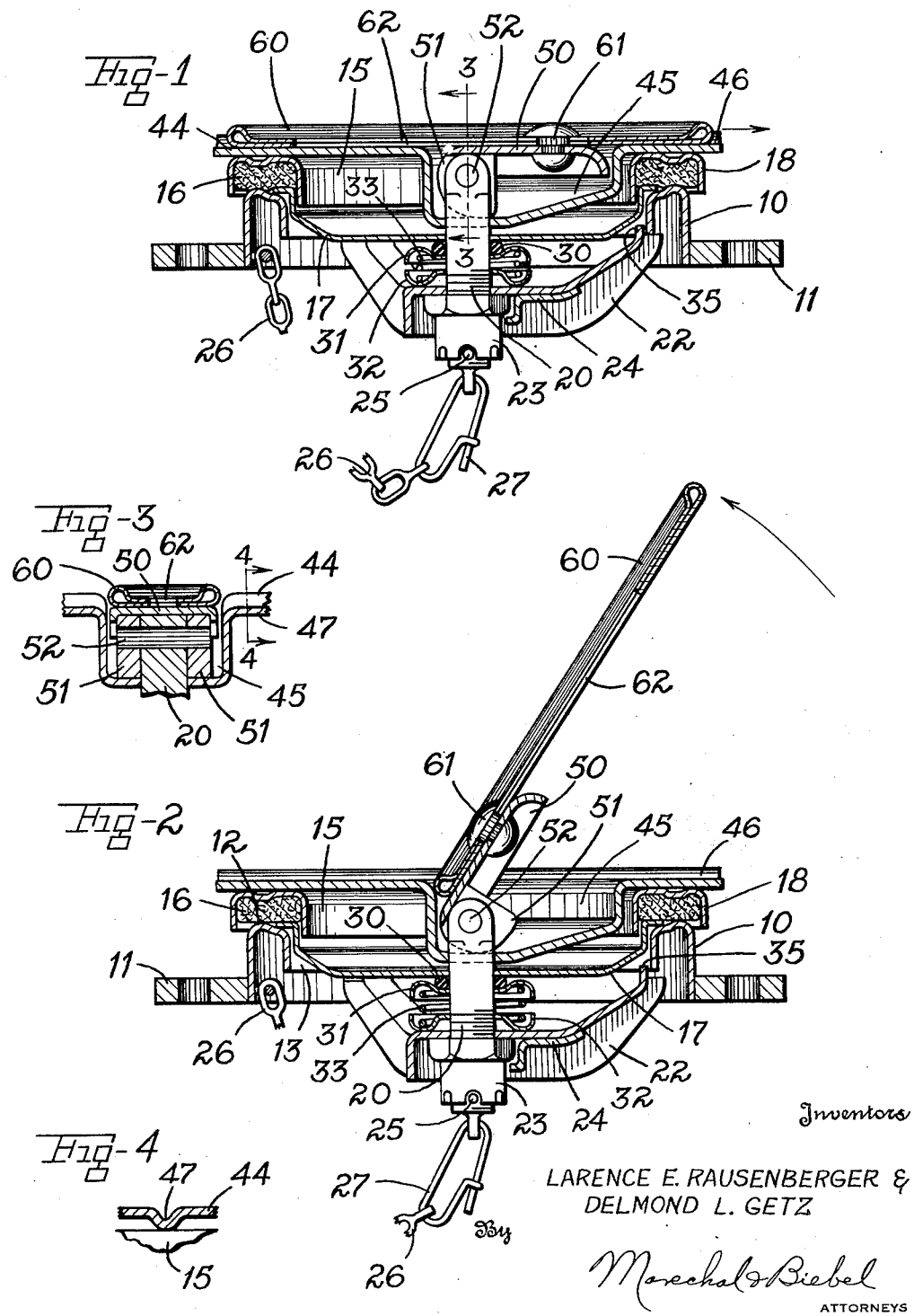

2,616,584

UNITED STATES PATENT OFFICE 2,616,584

FILLER CAP ASSEMBLY

Larence E. Rausenberger and Delmond L. Getz, Springfield, Ohio, assignors to The Steel Products Engineering Company, Springfield, Ohio, a corporation of Ohio Application March 20, 1950, Serial No. 150,656

8 Claims. (Cl. 220—25)

This invention relates to a filler cap assembly.

The invention has particular relation to filler cap assemblies adapted for use with fuel tanks and other containers wherein the interior of the container is under positive pressure, such for example as in the case of fuel tanks for airplanes.

One of the principal objects of the invention is to provide a filler cap assembly for the inlet of a container to retain the contents thereof under positive pressure which includes a closure adapted to seat on the rim of the inlet opening of the container and a clamp adapted to engage the under side of the rim to secure the closure in sealing relation with the rim, and which also includes an operating handle for quickly and positively shifting the clamp and closure between their respective sealing and release positions.

Another object is to provide such a filler cap assembly wherein the rim is provided with a plurality of stops and indexing slots or notches arranged in cooperating relation to position the clamp in proper alignment with the rim in its respective sealing and release positions and which also cooperate with the clamp to retain it in locked position when the cap is under pressure in such manner as to prevent its movement under vibration back to its release position.

Another object is to provide a filler cap assembly wherein the closure includes a gasket retainer and gasket adapted to seat on the rim of the inlet opening and in which a pressure member is arranged to interfit with the closure and rim in such manner as to retain the gasket in position for maximum sealing effectiveness with relation to the rim.

It is also an object of the invention to provide a filler cap assembly wherein movement of the closure and clamp into their relative sealing positions is effected by means of a cam, and in which the cover member of the assembly cooperates with the cam to exert sealing pressure on the closure and clamp and also cooperates with the operating handle for the cam to lock the cam against accidental release.

Other objects and advantages of the invention will be apparent from the following description, the accompanying drawings and the appended claims.

In the drawings—

Fig. 1 is a view in vertical section of a filler cap assembly in accordance with the invention showing the closure member thereof in sealed position and with the operating handle lever locked;

Fig. 2 is a view similar to Fig. 1 showing the handle raised for operation and the assembly released preparatory to removal;

Fig. 3 is a fragmentary section on the line 3—3 of Fig. 1;

Fig. 4 is a fragmentary section on the line 4—4 of Fig. 1;

Fig. 5 is a top view of the assembly in closed position;

Fig. 6 is a bottom view of the assembly; and

Fig. 7 is a detailed view of the adapter for the assembly, the view being taken on the line 7—7 of Fig. 6.

Referring to the drawing, which illustrates a preferred embodiment of the invention, the adapter 10 includes a peripheral flange portion 11 adapted to be riveted or otherwise secured to a container such as a fuel tank of an aircraft or other vehicle. The adapter includes an annular rim 12 which extends above the flange 11 and surrounds the filling opening. This rim includes an outer portion raised above the level of its inner portion, and this recessed inner portion terminates in a downwardly turned flange 13 extending axially inwardly of the filling opening.

An annular gasket retainer 15 has an inverted U-shaped configuration in section to receive and retain a gasket 16 adapted to seat on the rim 12 to seal the filling opening. A clamping plate 17 of cup-like section fits within the gasket retainer 15 to form therewith a composite closure member, and it includes a peripheral flange 18 adapted to seat along the inner periphery of rim 12 to help in retaining the inner portion of gasket 16 in position. Thus if a great amount of pressure were exerted against rim 12 by a small portion of gasket 16, the gasket would tend to deform quickly and thus lose some of its sealing ability, and this undesirable result is prevented by the provision of the clamping plate 17. It will also be seen that as the pressure within the container increases, the inner portion of gasket 16 may be forced outwardly towards the shoulder formed by the raised portion of rim 12, thus increasing the sealing ability of the gasket.

A stud 20 extends through the clamping plate 17, and the lower end of this stud carries a three pronged clamping member 22, which is supported on the stud by a castellated nut 23, the clamp and nut being secured together by means of three retainers 24 which are welded to the under surface of the clamp and overlap nut 23 as shown in Figs. 1, 2 and 6. A pin 25 is secured in the lower end of stud 20 to secure the stud and nut 23 in fixed relation, and the stud is also loosely connected with adapter 10 by means of a pin 26 and safety pin 27. The opening in clamping plate 17 through which stud 20 extends is sealed by means of a rubber O-ring 30 held in position by a pair of thrust washers 31 and 32 and a spring 33 positioned between the pressure plate and the upper surface of clamp 22.

The upper ends of the prong of arm portions of clamp 22 are adapted to seat against the lower rim of the flange 13 on adapter 10, and each of these clamp arms includes an upwardly extending tab 35, these tabs being proportioned to seat within the flange 13 and serve as centering guides. In order to provide for insertion of clamp 22 through adapter 10 and for removal of the clamp incident to opening the cap assembly, the flange 13 and the inner portion of rim 12 are provided with three slots 36 for receiving the ends of the clamp arms. Two stops 37 and 38 (Fig. 6) are welded to the adapter 10 below flange 13 to limit rotation of the clamp following insertion thereof through slots 36, the stop 37 being positioned immediately adjacent one of slots 36 and the other stop 38 being positioned adjacent one of three shallow cam notches 39 located intermediate the slots 36.

The upper end of the stud 20 extends through a circular cover 44 having a relatively deeply recessed portion 45 adapted to extend within the gasket retainer 15. Shallow channels 46 extend from opposite ends of the recess 45 to the periphery of cover 44, the under side of these channelled portions being adapted to seat on the gasket retainer 15, and stiffening ribs 47 extend along a diameter of the cover from the sides of recess 45 to the periphery of the cover and are similarly adapted to seat on the upper surface of gasket retainer 15.

A cam lever 50 includes two cam lugs 51 pivoted to the upper end of stud 20 by means of a pin 52, and these lugs have cam surfaces adapted to engage the bottom of the recess 45 in cover 44. The cam lever 50 is provided with an operating handle lever 60 which is slidably connected with cam lever 50 by means of the retaining stud 61 riveted in the cam lever 50. This retaining stud extends through a slot 62 running lengthwise of the handle lever 60, and the handle lever is so proportioned as to lie readily within the shallow channels 46 in the upper surface of cover 44.

Fig. 1 shows the assembly in closed and sealed position. The upper ends of the clamp arms 22 are seated against the lower rim of flange 13 within the cam notches 39, and the handle lever 60 is seated within the channels 46, with the retainer stud 61 being near the right-hand end of slot 62 as viewed in Figs. 1, 2 and 4. In this position, the high points of cam lugs 51 are in engagement with the bottom of groove 45, thus drawing stud 20 and clamp 22 upwards to clamp the gasket 16 firmly against the rim 12 of the adapter and against the rim portion 18 of clamping plate 17 to seal the filling opening.

In order to open the assembly, the first step is to slide handle lever 60 to the right as viewed in Figs. 1 and 2, until the retaining stud 61 is at the opposite end of slot 62 as shown in dotted lines in Fig. 5. The handle lever 60 and cam lever 50 can then be raised about the pivot pin 62 as shown in Fig. 2, which brings the lower points of cam lugs 51 against the bottom of groove 45, thus releasing the clamp 22. If there should be pressure within the container, the cap assembly will lift away from the rim 12 to permit the pressure to dissipate into the atmosphere. The cap assembly may then be rotated until one of the arms of clamp 22 strikes the stop 37, and since in this position of the parts the clamp arms are aligned with the slots 36, the assembly can be lifted out of the adapter.

To mount the assembly in sealing position, the reverse procedure is followed. With the handle lever 60 raised, the unit is set in place by inserting the clamp arms 22 through the slots 36 and then rotating the cover 44 in clockwise direction as viewed from above. This rotation continues only until one of the clamp arms strikes the stop 38, in which position the ends of the arms will be aligned with the notches 39. The handle lever 60 is then pressed downwardly into the position wherein the cam lugs 51 force the cover 44 downwardly as shown in Fig. 1, thus tightening the upper ends of the clamp arms 22 within the cam notches 39 to effect definite positioning of the clamp when the cap is under pressure and thus to prevent possible vibration of the clamp in such manner that it might twist back to its release position in alignment with slots 36. The final step in the closing operation is to slide the handle lever 60 back into the channels 46 into the position shown in Fig. 1 to secure the cam lever 50 in its locked position.

It will accordingly be seen that the present invention provides a filler cap assembly which is simple to construct and use and which is well adapted for use in conjunction with containers having the contents thereof under positive pressure. The assembly is quickly and easily mounted in sealing position or released for refilling the container, and at the same time it is positively locked in its sealing position and cannot work itself loose under even severe conditions of vibration or shock. The device is accordingly well adapted for use on vehicles such as airplanes or land vehicles which are subject to severe vibration in use, such as gunfire in the case of military vehicles, and the features of quick and easy removal and replacement are also of value for such military uses.

Reference is made to the copending application of L. E. Rausenberger, Serial No. 150,655, and W. B. Condit and D. L. Getz, Serial No. 150,688 filed of even date herewith and assigned to the same assignee as this application.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A filler cap assembly for the inlet of a container to retain positive pressure on the contents thereof, comprising an adapter for said container including an annular rim defining an inlet opening, closure means adapted to seat on said rim, a clamp including lateral projections adapted to engage the under side of said rim, operating means connecting said clamp and said closure means for relative movement and shiftable between a release position and an operating position securing said clamp and said closure member in sealing relation with said rim, said rim having slots in the inner periphery thereof for receiving said clamp projections therethrough, means on the under side of said rim angularly spaced from said slots for positively retaining said projections against angular movement towards said slots in the operating position of said operating means, and a pressure member adapted to engage the inner portion of said closure means in response to pressure within said container to compress said closure means radially outwardly against said rim for increased effective sealing.

2. A filler cap assembly for the inlet of a container to retain positive pressure on the contents thereof, comprising an adapter for said container including an annular rim defining an inlet opening, closure means adapted to seat on said rim, a clamp including lateral projections adapted to engage the under side of said rim, operating means connecting said clamp and said closure means for relative movement and shiftable between a release position and an operating position securing said clamp and said closure member in sealing relation with said rim, a pressure member adapted to engage the inner portion of said closure means in response to pressure within said container to compress said closure means radially outwardly against said rim for increased effective sealing, said rim having slots in the inner periphery thereof for receiving said clamp projections therethrough, the under side of said rim having notches therein spaced angularly from said slots for receiving and retaining said projections against angular movement towards said slots in the operating position of said operating means, and stops on the under side of said rim positioned adjacent at least one of said notches and one of said slots for limiting rotational movement of said clamp and for aligning said projections with said notches and said slots respectively.

3. A filler cap assembly for the inlet of a container to retain positive pressure on the contents thereof, comprising an adapter for said container including an annular rim defining an inlet opening, closure means for said opening including a gasket adapted to seat on said rim and a channelled retainer for said gasket, a clamp adapted to engage the under side of said rim, operating means connecting said clamp and said closure means for relative movement and shiftable between a release position and an operating position securing said clamp and said closure member in sealing relation with said rim, a plate positioned inwardly of said closure means and including a peripheral flange adapted to be received within said retainer between said gasket and said adapter rim to minimize inward deflection of said gasket under pressure from said operating means, and means supporting said plate for movement outwardly of said adapter under pressure from within said container to compress said gasket between said rim and said retainer.

4. A filler cap assembly for the inlet of a container to retain positive pressure on the contents thereof, comprising an adapter for said container including an annular rim defining an inlet opening, closure means for said opening including a gasket adapted to seat on said rim and a channelled retainer for said gasket, said rim including an inner portion recessed with respect to the outer portion thereof to provide a shoulder against which said gasket is adapted to be forced by pressure within said container for increased sealing, a clamp adapted to engage the under side of said rim, operating means for effecting relative movement of said gasket retainer and said clamp toward each other to clamp said rim therebetween and thus to secure said gasket in sealing position, a plate positioned inwardly of said closure means and including a peripheral flange adapted to be received in said retainer between said gasket and said recessed portion of said adapter ring to minimize inward deflection of said gasket under pressure from said operating means, and means supporting said plate for movement outwardly of said adapter under pressure from within said container to compress said gasket between said rim and said retainer.

5. A filler cap assembly for the inlet of a container to retain positive pressure on the contents thereof, comprising an adapter for said container including an annular rim defining an inlet opening, closure means adapted to seat on said rim, a clamp adapted to engage the under side of said rim, a stud supporting said clamp and extending through said closure means outwardly of said adapter, a cam mounted on the upper end of said stud, handle means for said cam adapted to shift said cam between a release position and a pressure position effecting relative movement of said clamp and said closure means into clamped relation with said rim to secure said closure means in said passage closing position, a pressure member adapted to engage the inner portion of said closure means in response to pressure within said container to compress said closure means radially outwardly against said rim for increased effective sealing, and means for releasably locking said handle means to secure said cam in said pressure position.

6. A filler cap assembly for the inlet of a container to retain positive pressure on the contents thereof, comprising an adapter for said container including an annular rim defining an inlet opening, closure means adapted to seat on said rim, a clamp adapted to engage the under side of said rim, a cover adapted to be received on the upper surface of said closure means, a stud supporting said clamp and extending through said closure means and said cover, a cam pivotally mounted on the upper end of said stud in position to engage the upper surface of said cover, means for moving said cam with respect to said stud between a release position and a pressure position forcing said cover and closure means toward said clamp to secure said closure means in sealing relation with said rim, and a pressure member adapted to engage the inner portion of said closure means in response to pressure within said container to compress said closure means radially outwardly against said rim for increased effective sealing.

7. A filler cap assembly for the inlet of a container to retain positive pressure on the contents thereof, comprising an adapter for said container including an annular rim defining an inlet opening, closure means adapted to seat on said rim, a clamp adapted to engage the under side of said rim, a cover adapted to be received on the upper surface of said closure means, a stud supporting said clamp and extending through said closure means and said cover, a cam pivotally mounted on the upper end of said stud in position to engage the upper surface of said cover, handle means for moving said cam with respect to said stud between a release position and a pressure position forcing said cover and closure means towards said clamp to secure said closure means in sealing relation with said rim, means on said cover cooperating with said handle means to retain said cam locked in said pressure position, and a pressure member adapted to engage the inner portion of said closure means in response to pressure within said container to compress said closure means radially outwardly against said rim for increased effective sealing.

8. A filler cap assembly for the inlet of a container to retain positive pressure on the contents thereof, comprising an adapter for said container including an annular rim defining an inlet opening, closure means adapted to seat on said rim, a clamp adapted to engage the under side of said rim, a cover adapted to seat on the upper surface of said closure means and including a recessed inner portion adapted to be received within said closure means, a stud supporting said clamp and extending through said closure means and said recessed portion of said cover, a cam pivoted on the upper end of said stud in position to engage the bottom of said recess, a handle lever for moving said cam on said stud between a release position and a pressure position forcing said cover and closure means towards said clamp to secure said closure means in sealing relation with said rim, means on said cover for receiving and retaining said handle lever in substantially perpendicular relation with said stud to lock said handle lever in position preventing movement of said cam to said release position, and means forming a sliding connection between said handle lever and said cam to provide for movement of said handle lever from said locked position into an operating position wherein the end thereof closest to said cam is free to pivot with said cam about said stud.

LARENCE E. RAUSENBERGER.
DELMOND L. GETZ.

REFERENCES CITED

The following references are of record in the file of this patent:

UNITED STATES PATENTS

| Number | Name | Date |
|---|---|---|
| 1,784,198 | Persson | Dec. 9, 1930 |
| 1,918,883 | Zay | July 18, 1933 |
| 1,929,464 | Andrie | Oct. 10, 1933 |
| 2,316,507 | Dykeman | Apr. 13, 1943 |